United States Patent
Mezzacapo et al.

(10) Patent No.: US 10,839,306 B2
(45) Date of Patent: *Nov. 17, 2020

(54) HARDWARE-EFFICIENT VARIATIONAL QUANTUM EIGENVALUE SOLVER FOR QUANTUM COMPUTING MACHINES

(71) Applicant: INTERNATIONAL BUSINESS MACHINES CORPORATION, Armonk, NY (US)

(72) Inventors: Antonio Mezzacapo, Westchester, NY (US); Jay M. Gambetta, Yorktown Heights, NY (US); Abhinav Kandala, Yorktown Heights, NY (US); Maika Takita, Yorktown Heights, NY (US); Paul K. Temme, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,725

(22) Filed: Apr. 17, 2019

(65) Prior Publication Data

US 2019/0251466 A1 Aug. 15, 2019

Related U.S. Application Data

(63) Continuation of application No. 15/720,577, filed on Sep. 29, 2017, now Pat. No. 10,332,023.
(Continued)

(51) Int. Cl.
*G06N 10/00* (2019.01)
*G06F 17/12* (2006.01)
*G06F 17/18* (2006.01)

(52) U.S. Cl.
CPC ............. *G06N 10/00* (2019.01); *G06F 17/12* (2013.01); *G06F 17/18* (2013.01)

(58) Field of Classification Search
CPC .................................................... G06N 10/00
See application file for complete search history.

(56) References Cited

U.S. PATENT DOCUMENTS 10,332,023 B2 * 6/2019 Mezzacapo ............ G06N 10/00
2011/0313741 A1 12/2011 Langhoff
(Continued)

OTHER PUBLICATIONS

A. Kandala et al., "Hardware-efficient Quantum Optimizer for Small Molecules and Quantum Magnets", Cornell University, Ithaca, New York, Apr. 18, 2017, pp. 1-24.
(Continued)

*Primary Examiner* — Chuong D Ngo
(74) *Attorney, Agent, or Firm* — Cantor Colburn LLP; Keivan Razavi

(57) ABSTRACT

Generating trial states for a variational quantum Eigenvalue solver (VQE) using a quantum computer is described. An example method includes selecting a number of samples S to capture from qubits for a particular trial state. The method further includes mapping a Hamiltonian to the qubits according the trial state. The method further includes setting up an entangler in the quantum computer, the entangler defining an entangling interaction between a subset of the qubits of the quantum computer. The method further includes reading out qubit states after post-rotations associated with Pauli terms in the target Hamiltonian, the reading out being performed for S samples. The method further includes computing an energy state using the S qubit states. The method further includes, in response to the estimated energy state not converging with an expected energy state, computing a new trial state for the VQE and iterating to compute the estimated energy using the new trial state.

20 Claims, 9 Drawing Sheets

Related U.S. Application Data

(60) Provisional application No. 62/561,840, filed on Sep. 22, 2017.

(56) References Cited

U.S. PATENT DOCUMENTS

| | | |
|---|---|---|
| 2014/0187427 A1 | 7/2014 | Macready |
| 2014/0344322 A1 | 11/2014 | Ranjbar |
| 2015/0052092 A1 | 2/2015 | Tang et al. |
| 2016/0132785 A1 | 5/2016 | Amin et al. |
| 2018/0089144 A1 | 3/2018 | Tomaru |
| 2019/0095811 A1 | 3/2019 | Mezzacapo |

OTHER PUBLICATIONS

J. McClean et al., "The theory of variational hybrid quantum-classical algorithms", New Journal of Physics, Institue of Physics Publishing, Bristol, Great Britain, vol. 18, No. 2, Feb. 4, 2016, pp. 1-22.
List of IBM Patents or Patent Applications Treated as Related; Date Filed: Apr. 17, 2019, 2 pages.
Peruzzo et al., "A variational eigenvalue solver on a photonic quantum processor," Nature Communications, DOI: 10.1038/ncomms5213, Jul. 23, 2014, pp. 1-7.
Russell, "IBM Breaks Ground for Complex Quantum Chemistry," Sep. 14, 2017, pp. 1-12.

\* cited by examiner

HARDWARE-EFFICIENT VARIATIONAL QUANTUM EIGENVALUE SOLVER FOR QUANTUM COMPUTING MACHINES

CROSS-REFERENCES TO RELATED APPLICATIONS

This patent application claims priority to U.S. Provisional Patent Application Ser. No. 62/561,840, filed Sep. 22, 2017, and further claims priority to U.S. patent application Ser. No. 15/720,577, filed Sep. 29, 2017, which are incorporated herein by reference in entirety.

STATEMENT REGARDING PRIOR DISCLOSURES BY THE INVENTOR OR A JOINT INVENTOR

The following disclosure(s) are submitted under 35 U.S.C. 102(b)(1)(A):
"Hardware-efficient Quantum Optimizer for Small Molecules and Quantum Magnets", Abhinav Kandala, Antonio Mezzacapo, Kristan Temme, Maika Takita, Jerry M. Chow, Jay M. Gambetta, 17 Apr. 2017 (arXiv:1704.05018).
"Hardware-efficient Variational Quantum Eigensolver for Small Molecules and Quantum Magnets", Abhinav Kandala, Antonio Mezzacapo, Kristan Temme, Maika Takita, Markus Brink, Jerry M. Chow, Jay M. Gambetta, 14 Sep. 2017 (Nature, 549, 242-246 (2017)).

BACKGROUND

The present application relates in general to quantum computing, and more specifically to implementation of a hardware-efficient variational quantum eigenvalue solver for quantum computing machines.

Quantum computing uses particle physics, which defines a fermion as any particle characterized by Fermi-Dirac statistics. These particles obey the Pauli Exclusion Principle. Fermions include all quarks and leptons, as well as any composite particle made of an odd number of these, such as all baryons and many atoms and nuclei. Fermions differ from bosons, which obey Bose-Einstein statistics. A fermion can be an elementary particle, such as the electron, or it can be a composite particle, such as the proton. According to the spin-statistics theorem in any reasonable relativistic quantum field theory, particles with integer spin are bosons, while particles with half-integer spin are fermions.

In addition to a spin characteristic, fermions also possess conserved baryon or lepton quantum numbers. Therefore, what is usually referred to as the spin statistics relation is in fact a spin statistics-quantum number relation. As a consequence of the Pauli Exclusion Principle, only one fermion can occupy a particular quantum state at any given time. If multiple fermions have the same spatial probability distribution, at least one property of each fermion, such as its spin, must be different. Fermions are usually associated with matter, whereas bosons are generally force carrier particles, although in the current state of particle physics the distinction between the two concepts is unclear. Weakly interacting fermions can also display bosonic behavior under extreme conditions. At low temperatures, fermions show superfluidity for uncharged particles and superconductivity for charged particles. Composite fermions, such as protons and neutrons, are the key building blocks of everyday matter. Quantum computing machines use such characteristics of the particles to solve various computationally expensive problems.

Quantum computing has emerged based on its applications in, for example, cryptography, molecular modeling, materials science condensed matter physics, and various other fields, which currently stretch the limits of existing high-performance computing resources for computational speedup. At the heart of a quantum computing machines lies the utilization of qubits (i.e., quantum bits), whereby a qubit may, among other things, be considered the analogue of a classical bit (i.e., digital bit—'0' or '1') having two quantum mechanical states (e.g., a high state and a low state) such as the spin states of an electron (i.e., '1'=↑ and '0'=↓), the polarization states of a photon (i.e., '1'=H and '0'=V), or the ground state ('0') and first excited state ('1') of a transmon, which is a superconducting resonator made from a capacitor in parallel with a Josephson junction acting as a non-linear inductor. Although qubits are capable of storing classical '1' and '0' information, they also present the possibility of storing information as a superposition of '1' and '0' states.

For quantum computing machines, where the dimension of the problem space grows exponentially, finding the eigenvalues of certain operators can be an intractable problem.

SUMMARY

According to one or more embodiments, an example system includes a memory device including computer-executable instructions. The system further includes a processor coupled with the memory. The processor executes the computer-executable instructions to generate trial states for a variational quantum Eigenvalue solver (VQE) using a quantum computer that comprises a plurality of qubits. The generation of trial states includes selecting a number of samples S to capture from the qubits for a particular trial state, the samples comprising measurements of the qubit states. The generation of trial states further includes mapping a Hamiltonian to the qubits of the quantum computer according to the trial state. The generation of trial states further includes setting up an entangler in the quantum computer, the entangler defining an interaction between at least a subset of the qubits of the quantum computer. The generation of trial states further includes reading out, from the quantum computer, qubit states after post-rotations associated with Pauli terms, the reading out being performed for the selected number of samples S. The generation of trial states further includes computing an estimated energy state using the S measurements of each Pauli term in the Hamiltonian. The generation of trial states further includes, in response to the estimated energy state not converging with an expected energy state, computing a new trial state for the VQE and iterating to compute the estimated energy using the second trial state.

According to one or more embodiments, an example method for to generating trial states for a variational quantum Eigenvalue solver (VQE) using a quantum computer that comprises a plurality of qubits includes selecting a number of samples S to capture from the qubits for a particular trial state, the samples being measurements of the qubit states. The generation of trial states further includes mapping a Hamiltonian to the qubits of the quantum computer. The generation of trial states further includes setting up an entangler in the quantum computer, the entangler defining an entangling interaction between at least a subset of the qubits of the quantum computer. The generation of trial states further includes reading out, from the quantum computer, qubit states after post-rotations associated with Pauli terms in the Hamiltonian, the reading out being performed for the selected number of samples S. The generation of trial states further includes computing an estimated energy state using the S measurements of each Pauli term in the Hamiltonian. The generation of trial states further includes in response to the estimated energy state not converging with an expected energy state, computing a new trial state for the VQE and iterating to compute the estimated energy using the new trial state.

According to one or more embodiments, an example quantum computing device includes multiple qubits. The quantum computing device further includes a plurality of resonators corresponding to each of the qubits, each resonator receiving control signals for the corresponding qubit, and receiving a readout signal for measurement of the qubit state of the corresponding qubit. The quantum computing device further includes resonators that couple qubits in the quantum device. The quantum computing device generates trial states for a variational quantum Eigenvalue solver (VQE). The generation of trial states includes receiving, by the resonators, control pulses associated with the trial state. The generation of trial states further includes setting up an entangler according to the trial state, the entangler defining an interaction between at least a subset of the qubits. The generation of trial states further includes reading out, by the resonators, qubit states after post-rotations associated with Pauli terms, the reading out being performed for a selected number of samples S for computing an estimated energy state. The generation of trial states further includes, in response to the estimated energy state not converging with an expected energy state, receiving control signals to update the entangler according to a new trial state for the VQE.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

In quantum mechanics, the Hamiltonian is the operator corresponding to the total energy of the system in most of the cases. It is usually denoted by H, also $\tilde{H}$ or $\hat{H}$. Its spectrum is the set of possible outcomes when one measures the total energy of a system. Because of its close relation to the time-evolution of a system, it is of fundamental importance in most formulations of quantum theory.

Quantum information processing holds the promise of solving specific computational problems, which are deemed to be too challenging for conventional classical hardware. A computational task which is particularly well suited for quantum computers is the simulation of quantum mechanical systems. The central application here is the simulation of strongly interacting Fermionic systems, which can for instance be found in quantum chemistry, materials science, and nuclear physics. In order to represent Fermionic degrees of freedom on a quantum computer, the Fermionic modes need to be mapped to qubits that are the elementary logical units of quantum computation. It should be noted that fermionic simulation is only one possible application of quantum computing, and other applications include quantum spin systems such as quantum magnets and combinatorial optimization problems.

It is known, however, that physical Fermionic systems obey parity conservation and in some cases the even stronger conservation of particle number. Hamiltonians or aspects of Hamiltonians are encoded onto qubits in the qubit simulation. The simulation is executed on a quantum computer having qubits. It is noted that a qubit is a physical piece of quantum hardware in a quantum computer and the qubit is a superconducting quantum device. In a Hamiltonian, the qubit is used as a term that represents the physical qubit.

The input to the quantum computer is the Hamiltonian (or terms of the Hamiltonian) that is used to encode a system that is to be simulated. The output is energy measured from the quantum computer. A quantum algorithm is a finite sequence of step-by-step instructions sent to the quantum computer to solve a particular problem. Here, experimenters are interested in obtaining estimates for the ground state energy of the input Hamiltonian. Therefore, this input Hamiltonian leads to a set of input data for a quantum simulation on the quantum computer.

Figure 1:
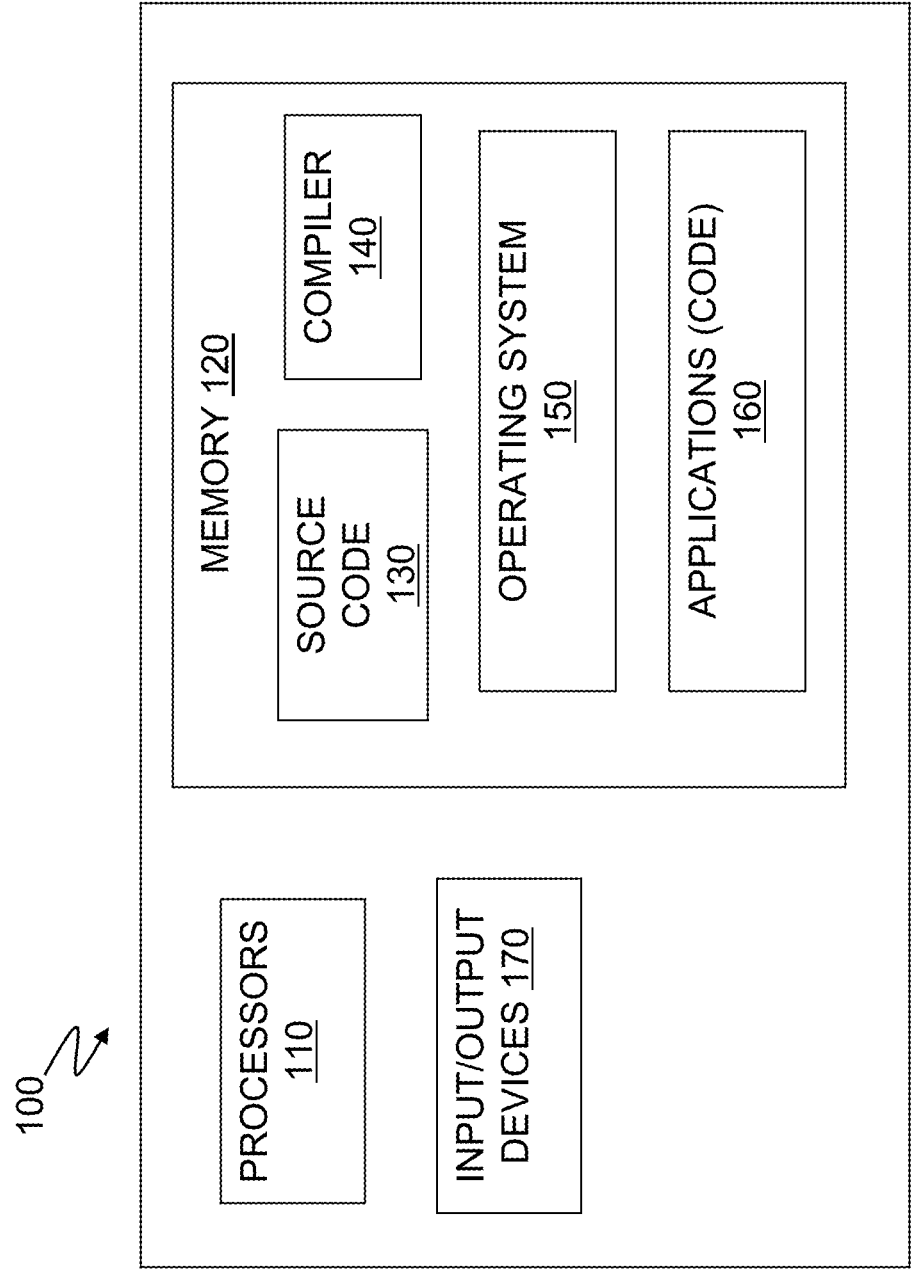
FIG. 1 is an example of a classical computer configured to execute the computations related to a Hamiltonian according to one or more embodiments of the present invention.

A computer 100 in FIG. 1 is programmed and configured to execute the encoding of quantum Hamiltonians on a set of qubits and any other (preparation) computations that are not performed on the quantum computer. One or more software applications 160 are programmed with computer instructions, such that processors 110 can execute them. After executing the respective preparation computations on the computer 100, the output (i.e., the output Hamiltonian) is then applied and executed on a quantum computer 200 in FIG. 2. There can be a feedback loop (back and forth process) of performing some computations on the computer 100, which are then fed and used by the quantum computer 200. The quantum computer 200 is for exemplary purposes only and it not meant to be the exact structure of the quantum computer. As understood by one skilled in the art, the classical computer 100 in FIG. 1 runs the determination of pulses, etc., and the quantum computer 200 in FIG. 2 runs the output.

Figure 2:
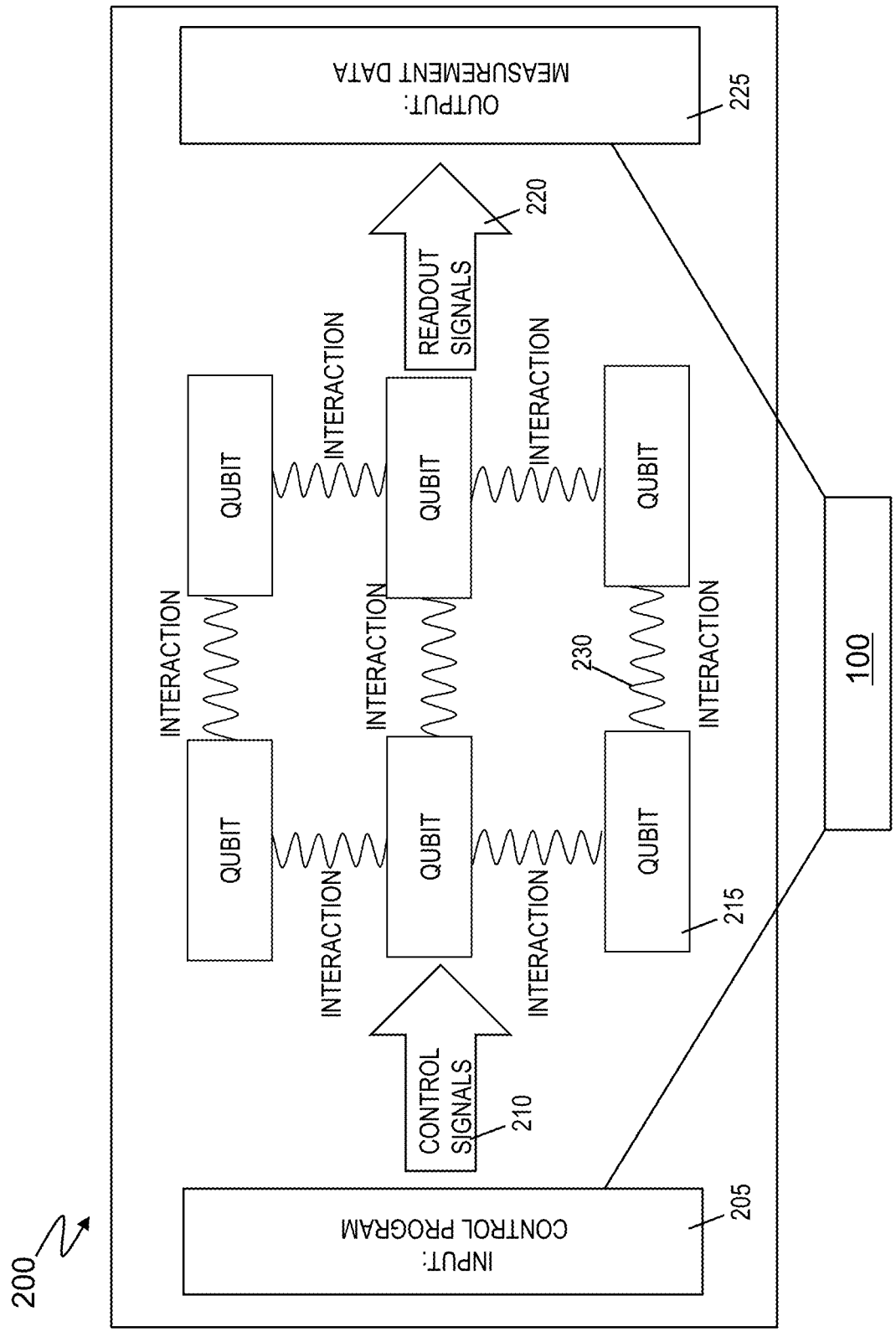
FIG. 2 is an example of a quantum computer configured to execute the output of the classical computer related to the Hamiltonian according to one or more embodiments of the present invention.

FIG. 2 is an example of a quantum computer 200 (quantum hardware) that can process the output from the computer 100 according to embodiments of the present invention. A quantum processor is a computing device that can harness quantum physical phenomena (such as superposition, entanglement, and quantum tunneling) unavailable to non-quantum devices. A quantum processor may take the form of a superconducting quantum processor. A superconducting quantum processor may include a number of qubits and associated local bias devices, for instance two or more superconducting qubits. An example of a qubit is a flux qubit. A superconducting quantum processor may also employ coupling devices (i.e., "couplers") providing communicative coupling between qubits.

The number of qubits, the interaction of qubits, and the configuration of qubits are all meant for example purposes and not limitation. It should be appreciated that the qubits (and readout resonators which are not shown) can be constructed in various different configuration and FIG. 2 is not meant to be limiting. In general, a quantum computer is any physical system that obeys the laws of quantum mechanics which satisfy the DiVincenzo criteria. These criteria set the requirements on the quantum mechanical system to be considered a quantum computer. The criteria include (1) a scalable physical system with well-characterized qubits, (2) the ability to initialize the state of the qubits to a simple fiducial state, (3) long relevant decoherence times, (4) a "universal" set of quantum gates, (5) a qubit-specific measurement capability, (6) the ability to interconvert stationary and flying qubits, and (7) the ability to faithfully transmit flying qubits between specified locations.

The quantum computer 200 in FIG. 2 illustrates an input 205 as a control program, control signals 210, qubits 215, readout signals 220, and measurement data 225 as the output. As a quantum mechanical system that satisfies these requirements, the quantum computer 200 is configured to receive control signals 210 as input 205 information (e.g., according to terms, aspects, etc., of the Hamiltonian) to apply a sequence of quantum gates and apply measurement operations. The quantum gates between different qubits 215 are mediated through their interactions 230. The measurement operators produce classical signals (as measurement data 225) that can be read by an experimenter controlling the system, i.e., the quantum computer 200.

Now turning back to FIG. 1, an example illustrates a computer 100, e.g., any type of computer system configured to execute algorithm(s) (including various mathematical computation as understood by one skilled in the art) for encoding quantum Hamiltonians on a set of qubits, as discussed herein, such that the result can be input to the quantum computer 200. The computer 100 can be a distributed computer system over more than one computer. Various methods, procedures, modules, flow diagrams, tools, applications, circuits, elements, and techniques discussed herein can also incorporate and/or utilize the capabilities of the computer 100. Indeed, capabilities of the computer 100 can be utilized to implement elements of exemplary embodiments discussed herein.

Generally, in terms of hardware architecture, the computer 100 can include one or more processors 110, computer readable storage memory 120, and one or more input and/or output (I/O) devices 170 that are communicatively coupled via a local interface (not shown). The local interface can be, for example but not limited to, one or more buses or other wired or wireless connections, as is known in the art. The local interface can have additional elements, such as controllers, buffers (caches), drivers, repeaters, and receivers, to enable communications. Further, the local interface can include address, control, and/or data connections to enable appropriate communications among the aforementioned components.

The processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computer 100, and the processor 110 can be a semiconductor based microprocessor (in the form of a microchip) or a macroprocessor.

The computer readable memory 120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 can incorporate electronic, magnetic, optical, and/or other types of storage media. Note that the memory 120 can have a distributed architecture, where various components are situated remote from one another, but can be accessed by the processor(s) 110.

The software in the computer readable memory 120 can include one or more separate programs, each of which includes an ordered listing of executable instructions for implementing logical functions. The software in the memory 120 includes a suitable operating system (O/S) 150, compiler 140, source code 130, and one or more applications 160 of the exemplary embodiments. As illustrated, the application 160 includes numerous functional components for implementing the elements, processes, methods, functions, and operations of the exemplary embodiments.

The operating system 150 can control the execution of other computer programs, and provides scheduling, input-output control, file and data management, memory management, and communication control and related services.

The application 160 can be a source program, executable program (object code), script, or any other entity comprising a set of instructions to be performed. When a source program, then the program is usually translated via a compiler (such as the compiler 140), assembler, interpreter, or the like, which can be included within the memory 120, so as to operate properly in connection with the O/S 150. Furthermore, the application 160 can be written as (a) an object oriented programming language, which has classes of data and methods, or (b) a procedure programming language, which has routines, subroutines, and/or functions.

The I/O devices 170 can include input devices (or peripherals) such as, for example but not limited to, a mouse, keyboard, scanner, microphone, camera, etc. Furthermore, the I/O devices 170 can also include output devices (or peripherals), for example but not limited to, a printer, display, etc. Finally, the I/O devices 170 can further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or an intranet. The I/O devices 170 can be connected to and/or communicate with the processor 110 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 160 is implemented in hardware, the application 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical solutions provided by the present invention addresses technical challenges for quantum computing machines when the dimension of a problem space grows exponentially, whereby finding the eigenvalues of certain operators can be an intractable problem. For example, consider electronic-structure problems, in which the fundamental goal is to determine state of motion of electrons in an electrostatic field created by stationary nuclei, and which includes solving for the ground-state energy of many-body interacting fermionic Hamiltonians. Solving such problems on a quantum computer relies on a mapping between fermionic and qubit operators, which restates the problem as a specific instance of a local Hamiltonian problem on a set of qubits. Given a k-local Hamiltonian H, composed of terms that act on at most k qubits, the solution to the local Hamiltonian problem amounts to finding its ground-state eigenvalue $E_G$ and ground state $|\Phi_G\rangle$, which satisfy $H|\Phi_G\rangle = E_G \oplus \Phi_G\rangle$. For k≥2, the problem is known to be Quantum Merlin Arthur (QMA)-complete. It should be noted that the technical solutions described herein are applicable to various other technical problems other than the electronic structure problem, such as quantum magnetism and the like.

In one or more examples, the technical solutions for addressing the technical problems, such as the electronic structure problems and the like, include using a variational quantum eigenvalue solver (VQE), which is used to find the lowest energy state of a target Hamiltonian. In one or more examples, the implementation of the VQE using the quantum computer 200 includes using experimentally accessible control parameters, to prepare trial states for the quantum computer 200, and measuring the energy associated with the prepared trial states. The measured energy is then fed to an optimization routine to generate a next set of control parameters that tend to lower the energy. Iterations are performed until the lowest energy is obtained to the desired accuracy.

Technical challenges of implementing the above protocol using trial states such as the unitary couple cluster (UCC) ansatz prepared quantum hardware, include restrictions due to coherence and controls, among others. For example, the UCC ansatz has a number of variational parameters that scale quartically with the number of spin orbitals that are considered in the single- and double-excitation approximation. Further, implementation of the UCC ansatz is sensitive to trotter and gate errors. Other technical challenges with implementations of VQE include the requirement of a large number of samples, which can result in an unreasonably large experiment time in the absence of reset schemes. Also, the number of measurements required for application of VQE to electronic structure problems is equal to the number of terms in the Hamiltonian, which in the most general case, scales as $\sim N^4$ for electronic structure problems, where N is the number of spin orbitals. This can further lead to large experiment time.

The technical solutions described herein address such technical challenges of using the quantum computer 200 to implement the VQE by facilitating hardware efficient trial state preparation suited to implementations with limited coherence of existing quantum hardware. Further, the technical solutions facilitate implementation(s) of a VQE that is insensitive to coherent gate errors. In one or more examples, the technical solutions described herein use a fixed frequency architecture with all-microwave qubit control, which maximizes quantum coherence of the quantum hardware, in the absence of frequency tunable components that are susceptible to flux noise, etc. Further, by using a microwave-only single qubit reset, the technical solutions described herein facilitate maintaining qubit coherence, while reducing total optimization time. The technical solutions described herein further facilitate parallelization of gates thus reducing trial state preparation time. In addition, the technical solutions described herein facilitate grouping of Hamiltonian terms measured by a unique set of single qubit rotation, which facilitates reducing a total number of measurements to be captured and analyzed, thus reducing the total time of the simulation. It should be noted that the technical solutions described herein provide additional advantages and benefits than those listed above, as will be evident to a person skilled in the art.

The technical solutions described herein facilitate implementing a hardware-efficient UCC ansatz preparation for a VQE, whereby trial states are parameterized by quantum gates that are tailored to the physical quantum computer 200 that is available.

Figure 3:
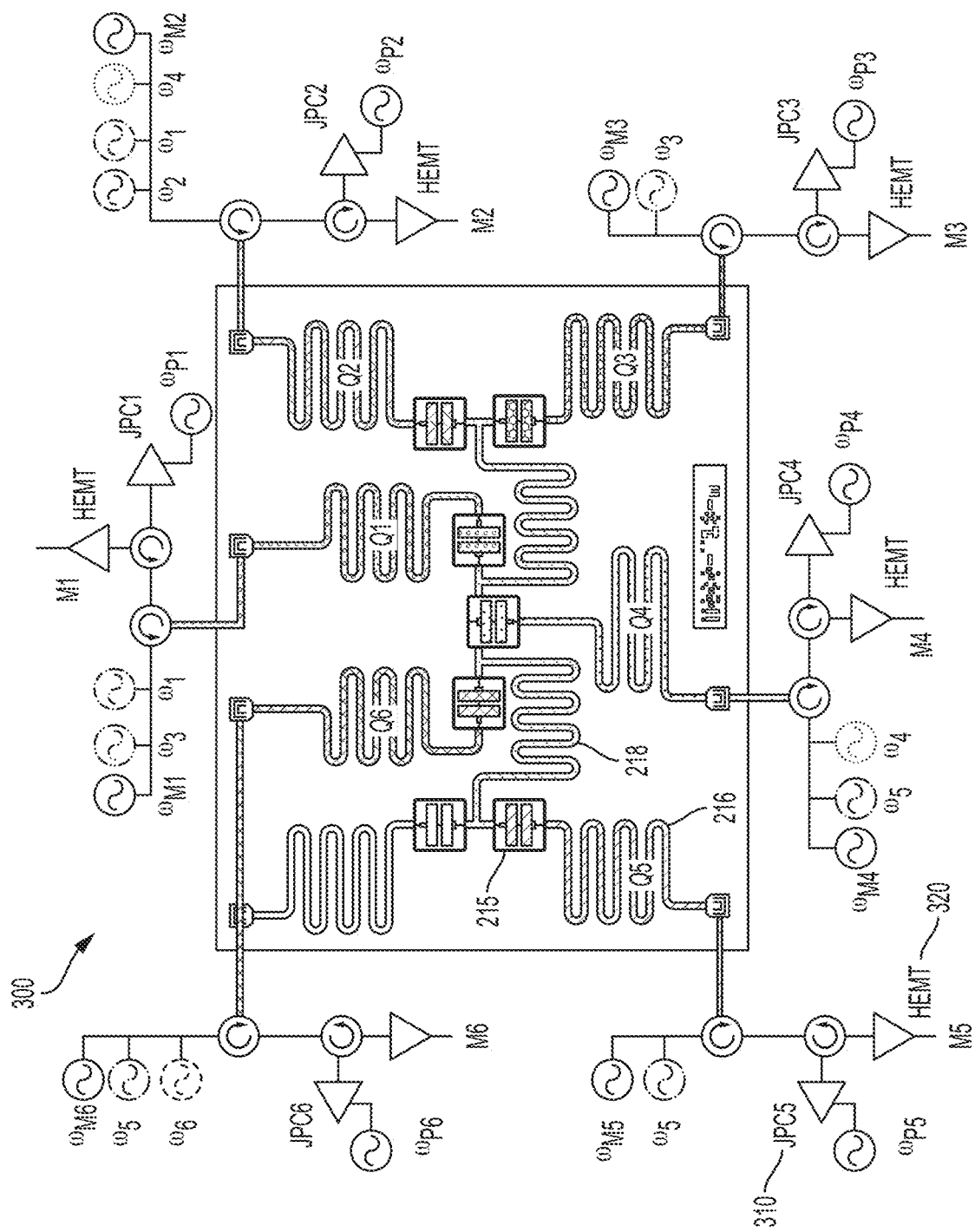
FIG. 3 depicts a block diagram of the quantum computer according to one or more embodiments.

FIG. 3 depicts a block diagram of the quantum computer according to one or more embodiments. The structure of the quantum computer 300 as depicted in FIG. 3 and described herein is for explanation of one or more embodiments, and not limiting the technical solutions described herein. As depicted, the quantum computer 300 includes seven qubits 215, such as Josephson junction (JJ) based transmon qubits, of which six are fixed frequency transmon qubits, and one is a central flux-tunable asymmetric transmon qubit. In other examples, the quantum hardware may include different number of qubits and a different combination of fixed-frequency and flux-tunable qubits.

Each qubit 215 has its own individual coplanar waveguide (CPW) resonator 216 for receiving control signals 210 and receiving readout signals 220. The qubits 215 are readout by dispersive measurements through the independent readout resonators 216, with each readout line having a sequence of low temperature amplifiers 310—a Josephson parametric converter (JPC1-JPC6) followed by a high electron mobility transistor 320 (HEMT; M1-M6) for achieving high assignment fidelity.

In one or more examples, the qubits are controlled solely by microwave pulses that are delivered via attenuated coaxial lines. The single qubit gates are implemented by microwave drives at the specific qubit $Q_i$'s frequency $f_i$, while the entangling two-qubit CR gates are implemented by driving a control qubit Qc at the frequency $\omega_t$ of the target qubit $Q_t$, where i, c, t ∈ {1; 2; 3; 4; 5; 6}, in the depicted example with 6 or more qubits. It should be noted that in other examples that use quantum hardware with different number of qubits, the qubit coupling may use different number of control qubits and/or target qubits.

Further, the state of each qubit 215 is measured at its readout resonator frequency $\omega_{Mi}$. The reflected readout signals are amplified first by the JPC 310, pumped at a frequency $\omega_{Pi}$, followed by the HEMT 320 amplifiers, for example at 4K. Each qubit 215 has corresponding characteristics, the characteristics including qubit transitions ($\omega_{01}/2\pi$), average relaxation times ($T_1$), average coherence times ($T_2$, $T_2^*$), readout resonator frequencies ($\omega_r/2\pi$), qubit anharmonicity ($\delta/2\pi$), readout assignment errors ($\varepsilon_r$), among others.

Further, to maintain stability of the gates used for trial state preparation, even during the long times associated with optimization of large Hamiltonians, the amplitude and phase of the single-qubit and two-qubit gates are calibrated during the course of usage. For example, to estimate the time scale and magnitude of drifts in pulse amplitude and phase, the gates are calibrated periodically over a predetermined duration, such as 6 hours, 10 hours, or any other duration.

Further, the quantum computer 300 includes shared CPW resonators 218 for qubit-qubit coupling, which are referred to as "quantum buses" 218. It should be noted that although FIG. 3 depicts two resonators providing the qubit-qubit coupling, in other examples, more resonators may be used to provide such coupling. Further, as depicted in FIG. 3, the quantum buses 218 enable one or more two-qubit entangling gates, such as microwave-only cross resonance (CR) gates which may be used to implement the entangler $U_{ENT}$ 402. In one or more examples, the entangler may include a different implementation, such as single-bit gates, or the like.

In one or more examples, the gates that constitute the entanglers $U_{ENT}$ in the trial state preparation are implemented by driving a control qubit $Q_c$ with a microwave pulse that is resonant with a target qubit $Q_t$. With the addition of single qubit rotations, the CR gate can be used to construct a controlled NOT (CNOT). In one or more examples, the entangling gate phase may be an additional variational parameter for the optimization of the VQE.

Figure 4:
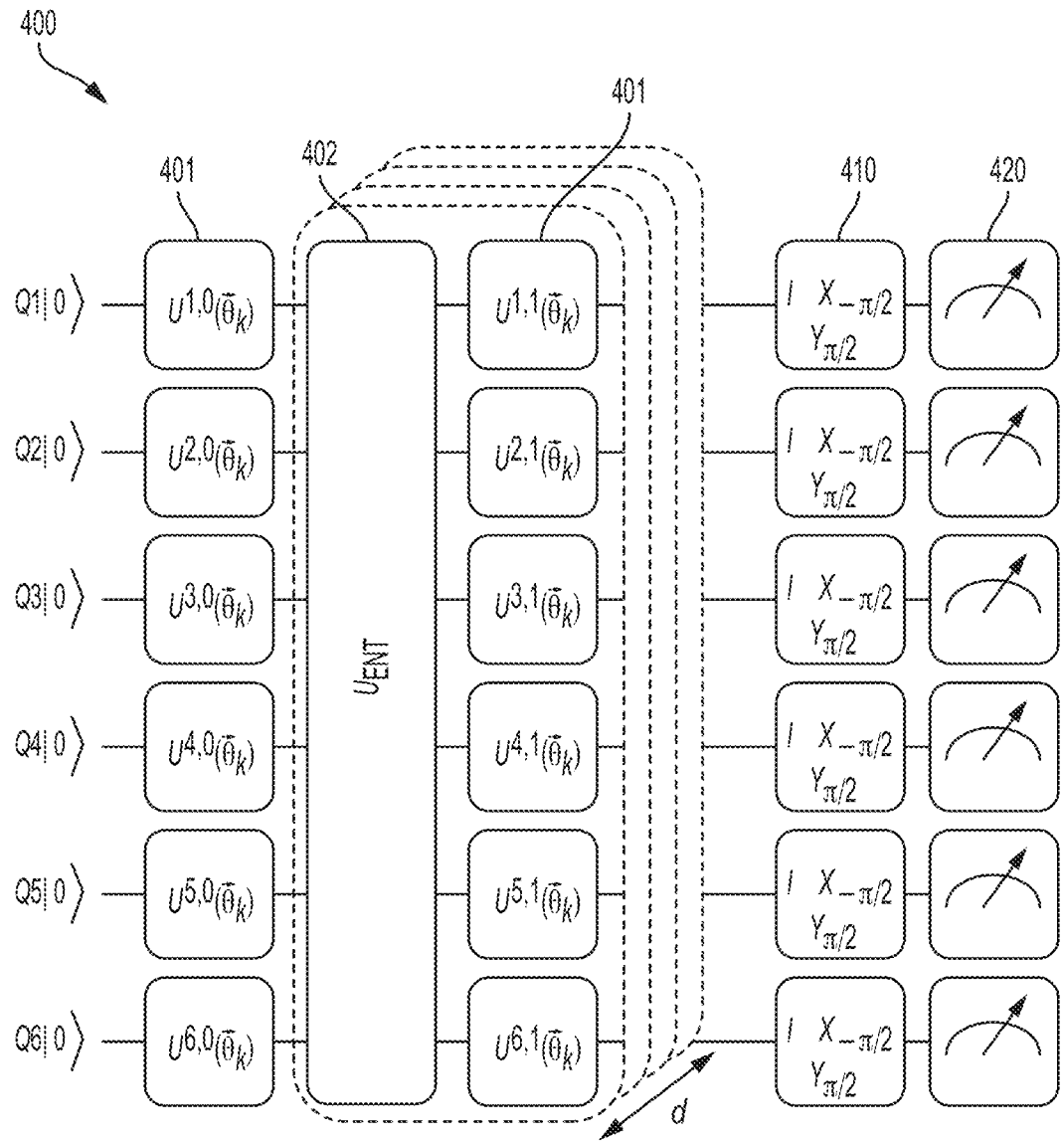
FIG. 4 depicts a quantum circuit for trial state preparation and energy estimation according to one or more embodiments.

FIG. 4 depicts a quantum circuit for trial state preparation and energy estimation according to one or more embodiments. The depicted example circuit is for 6 qubits, however in other examples, the quantum circuit can use a different number of qubits, fewer, or more than six. The circuit 400 is composed of a sequence of interleaved single-qubit 215 rotations 401, and entangling unitary operations $U_{ENT}$ 402 that entangle all the qubits 215 in the circuit 400.

An entangler 402 is a sequence of gates that entangle one or more of the qubits 215. Entanglement is delivered control pulses that are provided to the qubits 215. For example, an entangling interactions of the superconducting hardware of the quantum computer 300 may be described by a drift Hamiltonian $H_0$ that generates the entanglers $U_{ENT}=\exp(-iH_0\tau)$. For the hardware efficient trial states, these are interleaved with arbitrary single-qubit Euler rotations 401 which are implemented as a combination of Z and X gates, given by $$U^{q,i}(\vec{\theta}) = Z^q_{\theta_1^{q,i}} X^q_{\theta_2^{q,i}} Z^q_{\theta_3^{q,i}},$$

where q identifies the qubit 215 and i=0, 1, ... d refers to the depth position, as depicted in FIG. 4.

The Q-qubit trial states are obtained from the state $|00...0\rangle$, applying d entanglers $U_{ENT}$ that alternate with N Euler rotations, giving $$|\Phi(\vec{\theta})\rangle = \prod_{q=1}^{N} [U^{q,d}(\vec{\theta}) \times U_{ENT} \times$$

-continued $$\prod_{q=1}^{N} [U^{q,d-1}(\vec{\theta})] ... \times U_{ENT} \times \prod_{q=1}^{N} [U^{q,0}(\vec{\theta})] \Big| 00 ... 0 \Big\rangle.$$

Because the qubits 215 are initialized in their ground state $|0\rangle$, the first set of Z rotations of $U^{q,i}(\vec{\theta})$ is not implemented, resulting in a total of p=N(3d+2) independent angles. It should be noted that the evolution time T and the individual couplings in $H_0$ can be controlled. However, leaving the p control angles as variational parameters in the trial states facilitates the technical solutions to determine accurate optimizations using fixed-phase $U_{ENT}$. The hardware-efficient approach used by the technical solutions described herein does not rely on the accurate implementation of specific two qubit gates and can be used with any $U_{ENT}$ that generates sufficient entanglement. This is an improvement to UCC trial states that require high-fidelity quantum gates approximating a unitary operator tailored on a theoretical ansatz.

Figure 5:
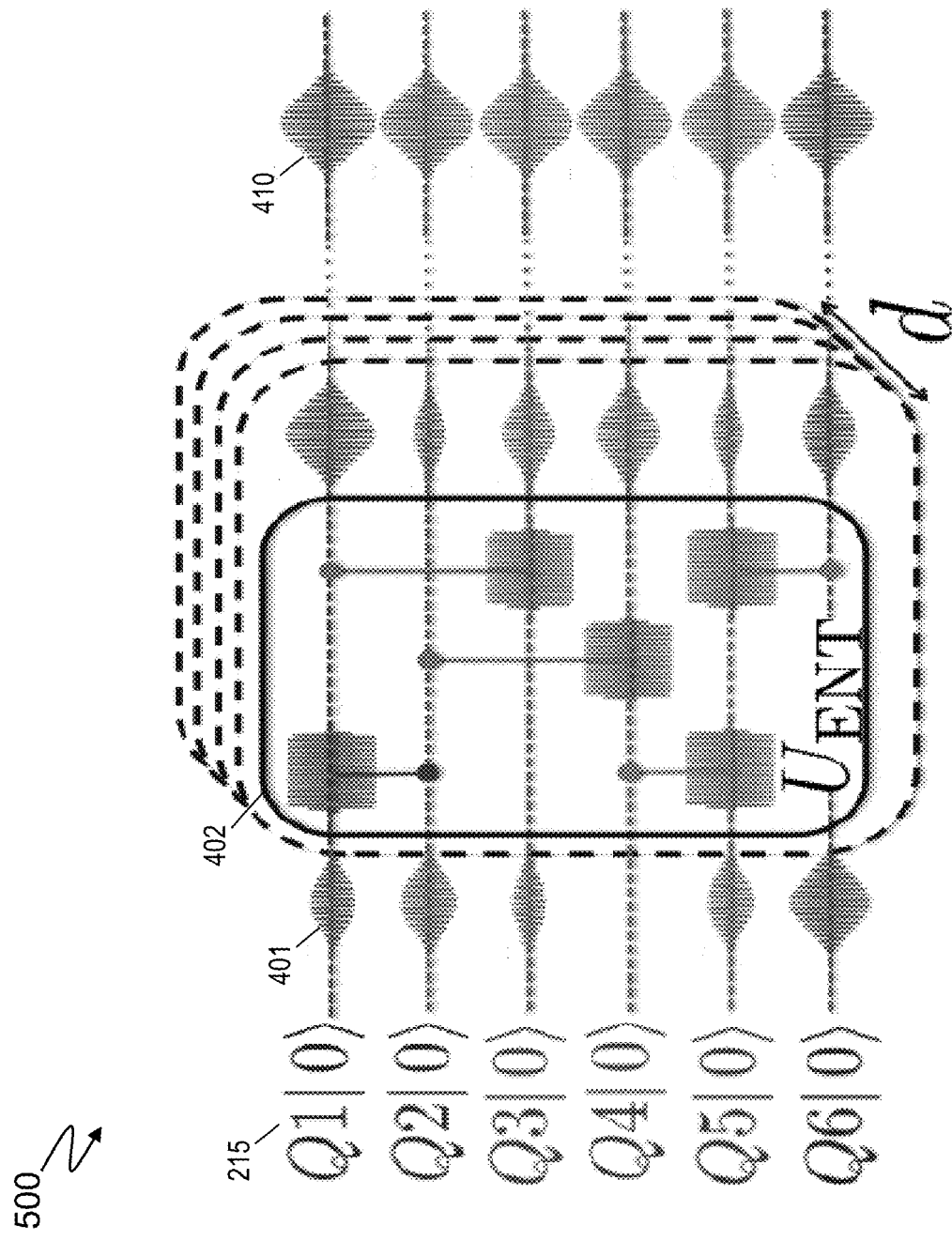
FIG. 5 depicts an example pulse sequence according to one or more embodiments.

FIG. 5 depicts an example pulse sequence according to one or more embodiments. The example depicts a pulse sequence 500 for the preparation of a six qubit trial state for the quantum computer 300. In one or more examples, the Z rotations are implemented as frame changes in the control software, while the X rotations are implemented by appropriately scaling the amplitude of calibrated X$\pi$ pulses, using a fixed total time of a predetermined durations, such as 100 ns, for every single-qubit rotation.

Further, the $U_{ENT}$ 402 is implemented as a composition or sequence of two-qubit cross resonance gates. In one or more examples, the CR resonance gates are implemented as CRc-t gates, implemented by driving a control qubit Qc with a microwave pulse resonant with a target qubit Qt. Further, Hamiltonian tomography of the CRc-t gates is used to reveal the strengths of the various interaction terms, and the gate time for maximal entanglement. Further, in one or more examples, the two-qubit gate times ($\tau$) are setup at a fixed value, such as 150 ns, that represents plateaus of minimal energy error around gate phases corresponding to the maximal pairwise concurrence. Using a fixed gate time further improves the performance of the quantum circuit 400 by minimizing the effect of decoherence without compromising the accuracy of the optimization outcome.

Referring back to FIG. 4, in one or more examples, after each trial state is prepared, the associated energy is estimated by measuring the expectation values of the individual Pauli terms in the Hamiltonian. These estimates are affected by stochastic fluctuations due to finite sampling effects.

Further, in one or more examples, different post-rotations 410 are applied after trial state preparation for sampling different Pauli operators in the input Hamultonian. The states of the qubit is then measured using read-out pulses 420. In one or more examples, the Pauli operators are grouped into tensor product basis sets that use the same post-rotations 410. Such grouping reduces the energy fluctuations, keeping the same total number of samples, reducing in this way the time over-head for energy estimation.

The energy estimates are then used, in one or more examples, by a gradient descent algorithm that relies on a simultaneous perturbation stochastic approximation (SPSA) to update the control parameters. The SPSA algorithm approximates the gradient using only two energy measurements, regardless of the dimensions of the parameter space p, achieving a level of accuracy comparable to standard gradient descent methods, in the presence of stochastic fluctuations. The technical solutions thus facilitate optimizing over multiple qubits and long depths for trial state preparation, thus facilitating optimizations over a number of parameters, for example p=30. It should be noted that the SPSA is just an example optimizer and that in other examples, the technical solutions may be implemented using a different optimization algorithm.

In one or more examples, the optimizer algorithm is executed by the computer 100 using the energy states output by the quantum computer 300. The computer 100 updates the control parameters and thus generates a next trial state that is fed into the quantum computer 300, for further improvement of the trial state. The back and forth process continues until a convergence of the estimated energy, or if the resources of the quantum computer 300 are saturated (for example, decoherence limit, sampling time).

Figure 6:
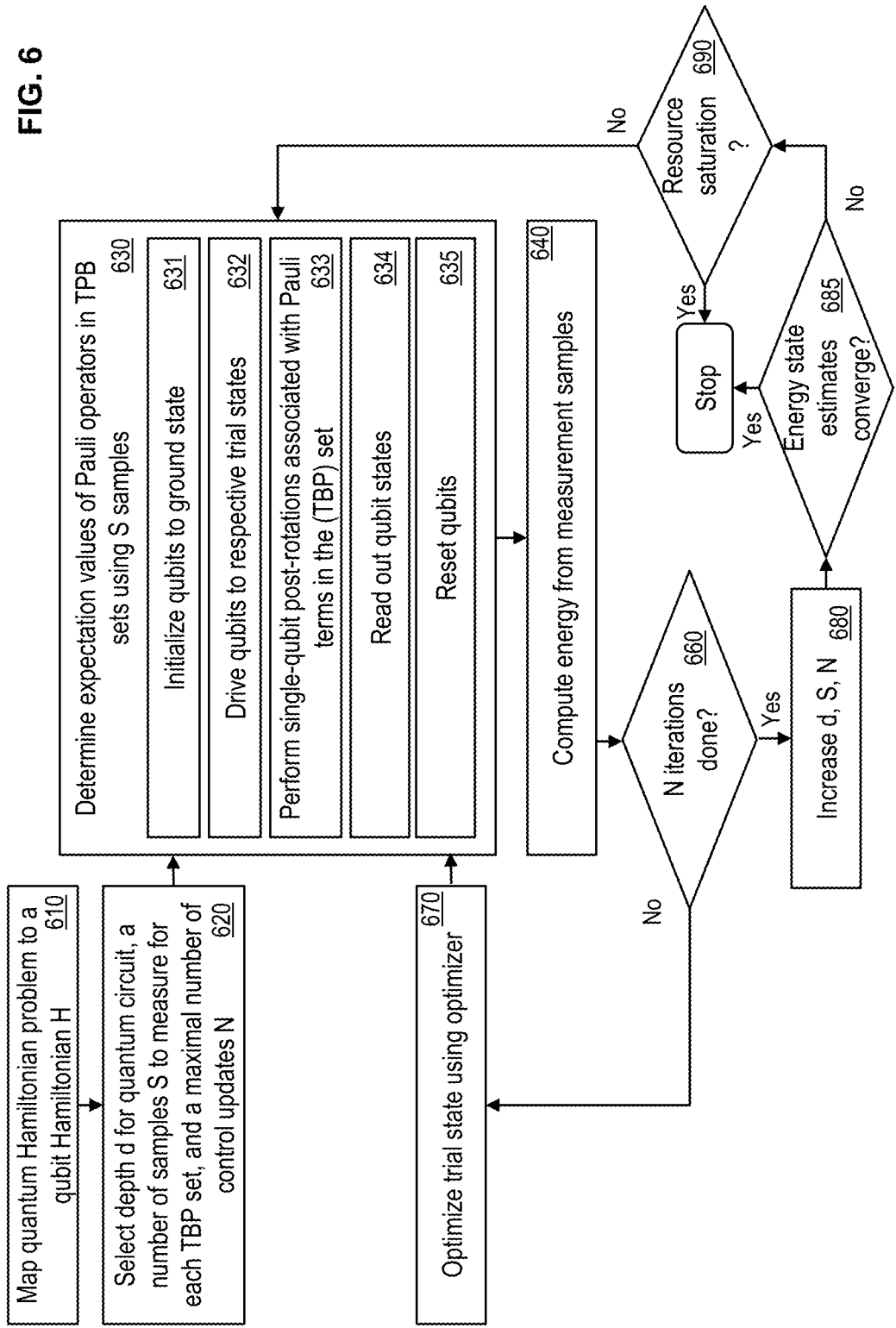
FIG. 6 illustrates a flowchart of an example method for executing a hardware-efficient variational quantum eigenvalue solver using a quantum computing machine according to one or more embodiments.

FIG. 6 illustrates a flowchart of an example method for executing a variational quantum eigenvalue solver using a quantum computing machine according to one or more embodiments. The flowchart is illustrated using an example implementation of the method in an electronic structure field, for determining the ground state energy for molecules, such as $H_2$, LiH, and BeH2 molecules. However, it is understood that the method is applicable to any other molecules, and further to any other technical problem to which the quantum computing machine is applicable, such as quantum magnetism, or any other.

The method includes mapping a quantum Hamiltonian problem to a qubit Hamiltonian H, as shown at 610. For example, for the molecular energy estimation, the molecular Hamiltonians considered are computed in the STO-3G basis, using software such as PYQUANTE™. It is understood that the molecular quantum Hamiltonian can be computed in any way. Mapping the Hamiltonian to the qubit includes determining a number of spin-orbitals for the qubits 215 based on the computed Hamiltonian. For example, in the molecular Hamiltonian, for an H2 molecule, each atom contributes a 1s orbital, for a total of 4 spin-orbitals. For example, the X axis is set as the interatomic axis for the LiH and BeH2 molecules, and consider the orbitals is for each H atom and 1s, 2s, $2p_x$ for the Li and Be atoms, assuming zero filling for the $2p_y$ and $2p_z$ orbitals, which do not interact strongly with the subset of orbitals considered. This choice of orbitals amounts to a total of 8 spin-orbitals for LiH and 10 for BeH2. It should be noted that in other examples, the mapping be different from the above description.

The Hamiltonians are expressed using the second quantization language as, $$H = H_1 + H_2 = \sum_{\alpha,\beta=1}^{M} t_{\alpha\beta} a_\alpha^\dagger a_\beta + \frac{1}{2} \sum_{\alpha,\beta,\gamma,\delta=1}^{M} u_{\alpha\beta\gamma\delta} a_\alpha^\dagger a_\gamma^\dagger a_\delta a_\beta,$$

where, $a_\alpha^\dagger(a_\alpha)$ is the fermionic creation(annihilation) operator of the fermionic mode $\alpha$, satisfying fermionic commutation rules $\{a_\alpha, a_\beta\}=0$, $\{a_\alpha^\dagger, a_\beta^\dagger\}=0$, $\{a_\alpha, a_\beta^\dagger\}=\delta_{\alpha\beta}$. Here, M=4; 8; 10 is the number of spin-orbitals for H2, LiH, and BeH2 respectively, and using chemists' notation for the two-body integrals, $$t_{\alpha\beta} = \int d\vec{x}_1 \Psi_\alpha(\vec{x}_1) \left( -\frac{\vec{\nabla}_1^2}{2} + \sum_i \frac{Z_i}{|\vec{r}_{1i}|} \right) \Psi_\beta(\vec{x}_1),$$

$$u_{\alpha\beta\gamma\delta} = \int\int d\vec{x}_1 d\vec{x}_2 \Psi_\alpha^*(\vec{x}_1) \Psi_\beta(\vec{x}_1) \frac{1}{|\vec{r}_{12}|} \Psi_\gamma^*(\vec{x}_2) \Psi_\delta(\vec{x}_2),$$

where $Z_i$ are the defined nuclei charges, $\vec{r}_{1i}$ and $\vec{r}_{12}$ are nuclei-electron and electron-electron separations, $\Psi_\alpha(\vec{x}_1)$ is the $\alpha$-th orbital wave function, and it is assumed that the spin is conserved in the spin-orbital indices $\alpha$, $\beta$, and $\alpha$, $\beta$, $\gamma$, $\delta$. Further, in the case of LiH and BeH2, the mapping considers perfect filling for the inner is orbitals, dressed in the basis in which H1 is diagonal. To this extent, the computer 100 may implement a Bogoliubov transformation on the modes $a'_\alpha = \Sigma_\beta U_{\alpha\beta} a_\beta$ such that $$H_1^d = U^\dagger H_1 U, \quad H_1^d = \sum_{\alpha=1}^{M} \omega'_\alpha a'^\dagger_\alpha a'_\alpha.$$

The "dressed" 1s modes of Li and Be are now to be filled for efficiently obtaining an effective Hamiltonian acting on generic states of the form $|\Psi\rangle = a'_{1s\uparrow}{}^\dagger a'_{1s\downarrow}{}^\dagger (\Sigma_{\beta \neq 1s\sigma} \psi_\beta a'_\beta{}^\dagger)|0\rangle$, where $\psi_\beta$ are generic normalized coefficients, and $1s\sigma = \{1s \uparrow, 1s \downarrow\}$ refers to the inner 1s orbitals of Li and Be. Note that this approximation is valid whenever $-\omega'_{1s\sigma} \gg |u'_{\alpha\beta\gamma\delta}| \forall \sigma$, $\alpha$, $\beta$, $\gamma$, $\delta$, i.e. in the case of very low-energy orbitals that do not interact strongly with the higher-energy ones. The ansatz $|\Psi\rangle = a'_{1s\uparrow}{}^\dagger a'_{1s\downarrow}{}^\dagger (\Sigma_{\beta \neq 1s\sigma} \psi_\beta a'_\beta{}^\dagger)|0\rangle$, allows to define an effective screened Hamiltonian on the 1s orbitals for the hydrogen atoms, and 2s and $2p_x$ for Lithium and Beryllium, for a total of 6 and 8 spin-orbitals for LiH and BeH2, respectively. According to this ansatz, the one-body fermionic terms containing the filled orbitals will now contribute as a shift to the total energy (I here is the identity operator)

$$\omega'_{1\uparrow} a'_{1\uparrow}{}^\dagger a'_{1\uparrow} \to \omega'_{1\uparrow} I, \omega'_{1\downarrow} a'_{1\downarrow}{}^\dagger a'_{1\downarrow} \to \omega'_{1\downarrow} I,$$

while some of the two-body interactions, containing the set F of 1s filled modes of Li and Be, $F=\{1s \uparrow, 1s \downarrow\}$, become effective one-body or energy shift terms, $$\frac{u'_{\alpha\beta\gamma\delta}}{2} a'^\dagger_\alpha a'^\dagger_\gamma a'_\delta a'_\beta \to \begin{cases} \frac{u'_{\alpha\beta\gamma\delta}}{2} a'^\dagger_\gamma a'_\delta, & \alpha=\beta, \alpha \in F, \{\gamma,\delta\} \notin F \\ \frac{u'_{\alpha\beta\gamma\delta}}{2} a'^\dagger_\alpha a'_\beta, & \gamma=\delta, \gamma \in F, \{\alpha,\beta\} \notin F \\ -\frac{u'_{\alpha\beta\gamma\delta}}{2} a'^\dagger_\gamma a'_\beta, & \alpha=\delta, \alpha \in F, \{\beta,\gamma\} \notin F \\ -\frac{u'_{\alpha\beta\gamma\delta}}{2} a'^\dagger_\alpha a'_\delta, & \gamma=\beta, \gamma \in F, \{\alpha,\delta\} \notin F \\ \frac{u'_{\alpha\beta\gamma\delta}}{2} I, & \alpha=\beta, \gamma=\delta, \alpha \neq \gamma, \{\alpha,\gamma\} \in F \\ -\frac{u'_{\alpha\beta\gamma\delta}}{2} I, & \alpha=\delta, \gamma=\beta, \alpha \neq \gamma, \{\alpha,\gamma\} \in F \end{cases},$$

while the two-body operators containing an odd number of modes in F will be neglected.

The fermionic Hamiltonian $$H = \sum_{\alpha,\beta \neq 1s\sigma} t_{\alpha\beta} a'^\dagger_\alpha a'_\beta + \frac{1}{2} \sum_{\alpha,\beta,\gamma,\delta \neq 1s\sigma} u'_{\alpha\beta\gamma\delta} a'^\dagger_\alpha a'^\dagger_\gamma a'_\delta a'_\beta$$

obtained in this way is mapped to the qubits 215. It should be noted that this is one specific reduction of the Hamiltonian used for the BeH2 and LiH molecules, and that in other examples, the Hamiltonian can be represented differently based on different reduction techniques. In one or more examples, the H2 Hamiltonian is mapped onto 4 qubits using a binary-tree mapping. Further, the M spin-orbitals are ordered by listing first the M/2 spin-up ones and then the M/2 spin-down ones. When using the binary-tree mapping, this produces a qubit Hamiltonian diagonal in the second and fourth qubit, which has the total particle and spin $\mathbb{Z}_2$ symmetries encoded in those qubits. In one or more examples, for the LiH and BeH2 Hamiltonians parity mapping is used, which has the two $\mathbb{Z}_2$ symmetries encoded in the M/2-th and M-th mode, even if the total number of spin orbitals is not a power of 2, as in the case of H2. Further, the Z Pauli operators of the M/2-th and M-th qubits are assigned a value based on the total number of electrons m in the system according to $$\{Z_{M/2}, Z_M\} = \begin{cases} \{+1, +1\}, & \mod(m, 4) = 0 \\ \{\pm1, -1\}, & \mod(m, 4) = 1 \\ \{-1, +1\}, & \mod(m, 4) = 2 \\ \{\pm1, -1\}, & \mod(m, 4) = 3 \end{cases},$$

where the +1(−1) on $Z_M$ for even(odd) m implies an even (odd) total electron parity. The values +1, −1 and ±1 for $Z_{M/2}$ mean that the total number of electrons with spin-up in the ground state is even, odd, or there is an even/odd degeneracy, respectively. In the last case both +1 and −1 can be used equivalently for $Z_{M/2}$. The final qubit-tapered Hamiltonians consist of 4, 99 and 164 Pauli terms supported on 2, 4, 6 qubits, each having 2, 25 and 44 tensor product basis (TPB) sets for H2, LiH and BeH2, respectively. As noted earlier, the Hamiltonians are mapped to the qubits differently in other examples.

Figure 8:
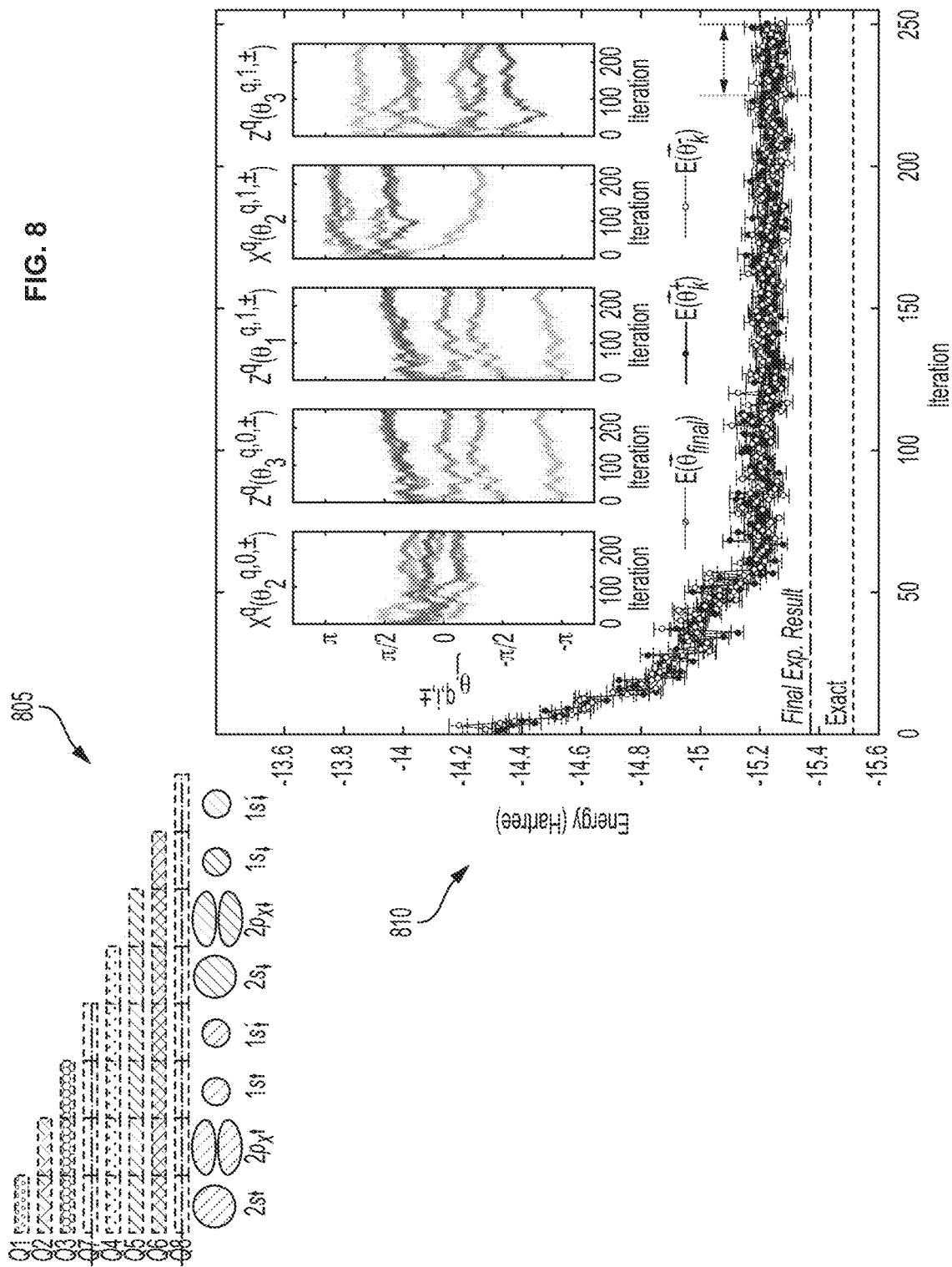
FIG. 8 depicts an example optimization of molecular structure application using the improved VQE according to one or more embodiments.

The Hamiltonian H is mapped to the qubits by using a parity mapping (for example, see FIG. 8 805). The mapped Hamiltonian is a sum of Pauli terms. A measurement sample of a collection of Pauli terms in a TPB can be measured by rotating in the TPB by using microwave pulses, and in one or more examples, solely using microwave pulses. For example, the microwave pulses are parameterized by variable amplitude and phase to represent the Pauli operators/terms. Alternatively, in one or more examples, the microwave pulses are parameterized by a constant amplitude with varying phase to represent the Pauli operators/terms.

Referring back to the flowchart of FIG. 6, the method further includes selecting depth d for quantum circuit 400, a number of qubit states S to measure for each TBP set, and a maximal number of control updates N, as shown at block 620. The number of samples S refers to a number of repetitions of a given measurement using a given trial state. The trial state is an interleaved sequence of single qubit gates that perform arbitrary rotations and entanglers. The entangler is the sequence of gates that entangle all the qubits utilized in the optimization. Quantum circuit depth d is the number of entanglers used in the trial state preparation. The gate is a sequence of microwave pulses that are parameterized by waveform, amplitude, and time. For example, the microwave pulses that can be parametrized by varying amplitude and phase. Alternatively, the microwave pulses can be parameterized by constant amplitude with varying phase. For example, for representing a trial state, the amplitude and/or phase of the control signals sent via the microwave pulses are configured to specific corresponding values.

Further, the method includes, for each TBP set, drawing S samples of qubit states of the mapped Hamiltonians using the quantum computer 300 by reading out the states of the qubits 215 that are setup according to the trial state, as shown at block 630. Determining the qubit states via the quantum computer 300 includes initializing the qubits 215 to ground state, as shown at block 631. The computer 100 sends reset signals to the quantum computer for such initialization. Further, the computer 100 sends control signals 210 to drive the qubits 215 to respective initial trial states, as shown at block 632. Further, the quantum computer 300 drives the qubits 215 to respective trial states during the iterations.

In one or more examples, the qubits are set to the trial states employing parallelization of gates to reduce trial state preparation time. For example, the qubits 215 are setup concurrently with the corresponding pulse sequences 500 representing the trial state.

Further, single-qubit post-rotations 410 associated with Pauli terms in the TBP set are performed, as shown at block 633. The post-rotations facilitates the readout signals 220 from the qubits 215 to compute the expectation value of the Hamiltonian operator(s) mapped onto the qubits 215. Once mapped to the qubits 215, as described earlier, every molecular Hamiltonian is expressed as a weighted sum of T Pauli terms supported on Q qubits $H=\Sigma_{\alpha=1}^T h_\alpha P_\alpha$, where each $P_\alpha \in \{X, Y, Z, I\}^{\otimes Q}$ is a tensor product of single-qubit Pauli operators X, Y, Z, and the identity I, on Q qubits, with $h_\alpha$ being real coefficients.

The energy state estimate is given by $\langle \Phi(\vec{\theta}_k)|H|\Phi(\vec{\theta}_k)\rangle \equiv \langle H \rangle_k$ for the k-th control update. This can be done by averaging measurements outcomes from each iteration, using the same initial state, applying the quantum gates parametrized by $\vec{\theta}_k$, and finally performing projective measurements on the individual qubits. Because access to direct measurements of the Hamiltonian operator $\langle H \rangle$ and its variance is not available, the individual Pauli operators $P_\alpha$ are sampled and the mean values and variances $\langle P_\alpha \rangle$, $\langle P_\alpha^2 \rangle, =\langle P_\alpha^2-\langle P_\alpha\rangle^2\rangle$ are estimated from the measurements outcomes of the α-th Pauli operator. The energy and Hamiltonian variance can then be obtained as $$\langle H \rangle = \sum_{\alpha=1}^T h_\alpha \langle P_\alpha \rangle,$$

$$\text{Var}[H] = \sum_{\alpha=1}^T h_\alpha^2 \langle \Delta P_\alpha^2 \rangle$$

The variance on the mean energy Var[H] is different from $\langle \Delta H^2 \rangle$ because the individual Pauli terms are sampled separately; for example, eigenstates of H have $\langle \Delta H^2 \rangle = 0$, but a finite Var[H]≠0. The error on the mean $$\varepsilon = \sqrt{\frac{\text{Var}[H]}{S}} \leq \sqrt{\frac{T|h_{max}^2|}{S}}$$

where $h_{max}=\max_\alpha |h_\alpha|$ is the absolute value of the largest Pauli coefficient. Because sampling S times for a large number of trial states and Pauli operators can cause significant time overhead, using the same state preparations to measure different Pauli operators facilitates saving such overhead for collecting multiple samples.

Hence, in one or more examples, the quantum computer 300 groups different Pauli terms for improving time efficiency. The individual Pauli operators are measured by correlating measurement outcomes of single-qubit dispersive readouts in the Z basis, which can be done simultaneously because each qubit 215 is provided with an individual readout resonator 216. In case a target multi-qubit Pauli operator contains non-diagonal single-qubit Pauli operator, single-qubit rotations (post-rotations) are performed before the measurement in the Z basis. For example, specifically, a $-\pi/2(\pi/2)$ rotation along the X(Y) axis to measure a Y(X) single-qubit Pauli operator.

Further, To minimize sampling overheads, we group the T Pauli operators $P_\alpha$ in A sets $s_1, s_2, \ldots s_A$, which have terms that are diagonal in the same tensor product basis. The post-rotations required to measure all the Pauli terms in a given TPB set are the same, and a unique state preparation can be used to sample all the Pauli operators in the same set. By doing so, however, covariance effects in the same TPB set contribute to the variance of the total Hamiltonian, $$\mathrm{Var}^G[H] = \sum_{i=1}^A \sum_{\alpha,\beta \in s_i} h_\alpha h_\beta \langle (P_\alpha - \langle P_\alpha \rangle)(P_\beta - \langle P_\beta \rangle) \rangle \le h_{max}^2 (T + A s_{max}^2),$$

Where $s_{max}=\max_i |s_i|$ is the number of elements in the largest TPB set. Keeping the same total number of measurements TS as in the above equation for the error, the error on the mean in this case, using the grouping, is given by $$\varepsilon = \sqrt{\frac{\mathrm{Var}^G[H]}{S}} \le \sqrt{\frac{A h_{max}^2 (T + A s_{max}^2)}{TS}},$$

which can be compared to the case in which one samples the single Pauli terms individually (above). The error contribution from the covariance (which can be positive or negative) has to be traded off against the use of less samples from grouping. Further, the energy and Hamiltonian variance can be estimated as $$\langle \widetilde{P_\alpha} \rangle = \frac{1}{S} \sum_{i=1}^S X_{i,\alpha},$$

$$\widetilde{\mathrm{Var}^G}[H] = \sum_{i=1}^A \sum_{\alpha,\beta \in s_i} h_\alpha h_\beta \mathrm{cov}(\langle \widetilde{P_\alpha} \rangle \langle \widetilde{P_\beta} \rangle),$$

where $X_{i,\alpha}$ is the outcome of the i-th measurement on the $\alpha$-th Pauli term. Further yet, the covariance matrix element is defined after S measurements as $$\mathrm{cov}(\langle \widetilde{P_\alpha} \rangle \langle \widetilde{P_\beta} \rangle) = \frac{1}{S-1} \sum_{i=1}^S (X_{i,\alpha} - \langle \widetilde{P_\alpha} \rangle_k)(X_{i,\beta} - \langle \widetilde{P_\beta} \rangle).$$

Referring back to the FIG. 6, the method further includes reading out the qubit states, as shown at block 634. The qubits 215 are further reset, in preparation of a further iteration, if required, as shown at block 635. The reset is performed using a microwave pulse only scheme, whereby the computer 100 sends a reset microwave pulse to the quantum computer 300, specifically for the qubit(s) that is to be reset. The reset microwave pulse is a predetermined pulse associated with the resonators of the quantum computer 300, and may vary according to the quantum computer 300 used. The method loops over the number of TPB sets, as shown at block 630. The expectation value of each set of Pauli operators is obtained with the same trial state.

Further, the qubit states are used to compute energy using the S sampled qubit states, as shown at block 640. The method further includes determining if the N control updates have been completed yet, as shown at block 660. If N iterations have not been completed, the method includes using an optimizer to analyze the energy estimate values that have been captured using the present trial state, and optimize the trial state by revising the pulse sequences 410 being used for the entanglement, as shown at block 670. For example, the optimization may be performed using machine learning algorithms, such as a gradient descent algorithm like a simultaneous perturbation stochastic algorithm (SPSA). The optimization provides updated angles according to which the control pulses (microwave) 401 are sent to the qubits 215.

The energy estimate before every update of the angles $\vec{\theta}$ is based on a number of parameters p=N(3d+2), and grows linearly with the depth of the circuit d and the number of qubits Q. As the number of parameters increases the optimization component of the algorithm increases in overheads. The accuracy of the optimization may also be significantly lowered by the presence of energy fluctuations at the k-th step $\varepsilon_k$. Furthermore, on the quantum hardware 300, there are time overheads associated with loading of pulse waveforms on the electronics, resonator and qubit reset, and repeated sampling of the qubit readout. The optimizer also has to be robust to statistical fluctuations, and use the least number of energy measurements per iteration. The SPSA gives a level of accuracy in the optimization of the cost function that is comparable with finite-difference gradient approximations, while saving an order O(p) of cost function evaluations and is applicable in the context of quantum control and quantum tomography.

Figure 7:
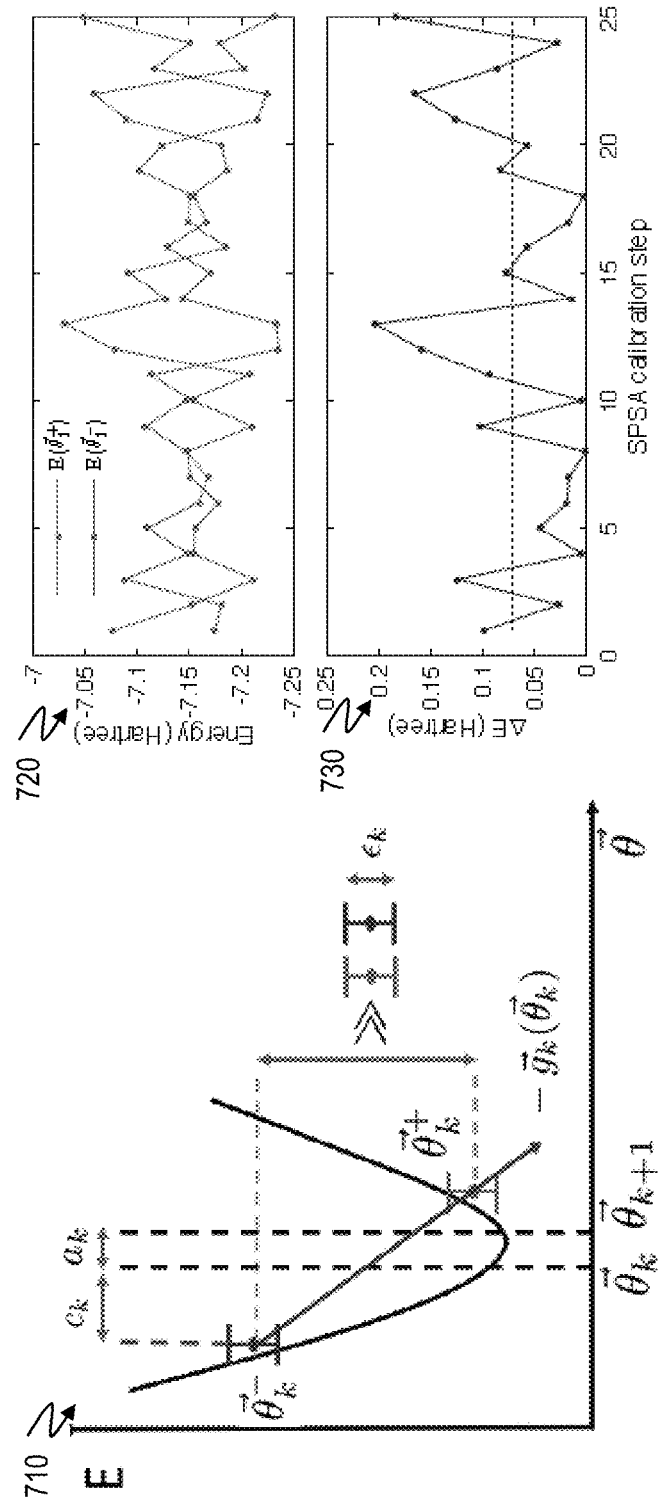
FIG. 7 depicts example plots depicting calibrations for parameters in an example scenario.

In one or more examples, In the SPSA approach, for every step k of the optimization, samples from p symmetrical Bernoulli distributions $\vec{\Delta}_k$ are used along with preassigned elements from two sequences converging to zero, $c_k$ and $a_k$. The gradient at $\vec{\theta}_k$ is approximated using energy evaluations at $\vec{\theta}_k^\pm = \vec{\theta}_k \pm c_k \vec{\Delta}_k$, and is constructed as $$\vec{g}_k(\vec{\theta}_k) = \frac{\langle \Phi(\vec{\theta}_k^+) | H | \Phi(\vec{\theta}_k^+) \rangle - \langle \Phi(\vec{\theta}_k^-) | H | \Phi(\vec{\theta}_k^-) \rangle}{2 c_k} \vec{\Delta}_k,$$

as illustrated in FIG. 7 in plot 710. The gradient approximation only requires two estimations of the energy, regardless of the number p of variables in $\vec{\theta}$. The controls are then updated as $\vec{\theta}_{k+1} = \vec{\theta}_k - a_k \vec{g}_k(\vec{\theta}_k)$.

The convergence of $\theta_k$ to the optimal solution $\vec{\theta}^*$ happens even in the presence of stochastic fluctuations, if the starting point is in the domain of the attraction of the problem. Convergence remains an open issue if the starting point for the controls is not in a domain of attraction. In this case strategies like multiple competing starting points are adopted. For example, sequences $c_k$, $a_k$ are chosen as $$c_k = \frac{c}{k^\gamma},$$

$$\alpha_k = \frac{\alpha}{k^a}.$$

Here, the parameters $\alpha$, $\gamma$ are predetermined, for example $\{\alpha, \gamma\} = \{0.602, 0:101\}$, for ensuring the smoothest descent along the approximate gradients defined for $\vec{\theta}_{k+1}$ above. The value of c is tuned to adjust the robustness of the gradient evaluation with respect to the magnitude of the energy fluctuations. In one or more examples, large fluctuations of the energy require gradient evaluations with large $c_k$, so that the fluctuations do not substantially affect the gradient approximation. This condition is valid in the regime $$|\langle\Phi(\vec{\theta}_k^+)|H|\Phi(\vec{\theta}_k^+)\rangle - \langle\Phi(\vec{\theta}_k^-)|H|\Phi(\vec{\theta}_k^-)\rangle| >> \varepsilon_k,$$

as shown in 710. In other words, good gradient approximations are obtained if the energy difference is larger than the stochastic fluctuations on the energy, and the parameter c is heuristically chosen to meet this condition. For example, $c=10^{-1}$ is used to ensure robustness in situations that that include decoherence noise and energy fluctuations, while the smaller $c=10^{-2}$ factor is used in the numerical optimizations where the energy is evaluated without fluctuations.

The parameter a is then calibrated experimentally in order to achieve a reasonable angle update on the first step of the optimization, for example as $|\theta_2^{(i)} - \theta_1^{(i)}| = 2\pi/10$, for all the angles i=1, 2, ... p. In one or more examples, to achieve this, an inverse formula is used that is based on $$\alpha = \frac{2\pi}{5} \frac{c}{\langle|\langle\Phi(\vec{\theta}_1^+)|H|\Phi(\vec{\theta}_1^+)\rangle - \langle\Phi(\vec{\theta}_1^-)|H|\Phi(\vec{\theta}_1^-)\rangle|\rangle_{\vec{\Delta}_1}},$$

Where the notation $\langle\ \rangle_{\vec{\Delta}_1}$ indicates an average over different samples from the distribution $\vec{\Delta}_1$ that generates the first gradient approximation. In one or more examples, by averaging along different directions, measure the average slope of the functional landscape $\langle\Phi(\vec{\theta}_k)|H|\Phi(\vec{\theta}_k)\rangle$ of can be measured in the vicinity of the starting point $\vec{\theta}_1$ and calibrate the experiment accordingly.

For example, FIG. 7 includes example plots 720 and 730 depicting parameter a being calibrated by measuring 25 (times the energies $E(\vec{\theta}_1^\pm) = \langle\Phi(\vec{\theta}_1^\pm)|H|\Phi(\vec{\theta}_1^\pm)\rangle$ measured for the LiH molecule at the depicted bond distances, with d=1, from the starting angles $\vec{\theta}_1$ for different random gradients approximations. It should be noted that during the optimization by the method execution, the value of the energy $\langle\Phi(\vec{\theta}_k)|H|\Phi(\vec{\theta}_k)\rangle$ for the k-th optimized angles are not measured and instead only the values $\langle\Phi(\vec{\theta}_1^+)|H|\Phi(\vec{\theta}_1^+)\rangle$ and $\langle\Phi(\vec{\theta}_1^-)|H|\Phi(\vec{\theta}_1^-)\rangle$ are measured and reported, which serve to generate a new gradient approximation. The underlying optimized angles $\vec{\theta}_k$ are only measured at the end of the optimization, averaging over the last 25 $\vec{\theta}_k^+$ and 25 $\vec{\theta}_k^-$ to further minimize stochastic fluctuations effect. Further-more, this last average is done with $10^5$ samples, as opposed to the $10^3$ samples used to generate $\vec{\theta}_k^+$ and $\vec{\theta}_k^-$ during the optimization, in order to reduce the error on the measurement.

Referring back to the flowchart of FIG. 6, once the N iterations with control updates using the optimizer have been performed, and if the energy convergence has not yet occurred, the parameters are incremented by predetermined values, as shown at block 680. For example, the number of samples S is increased, and the number of iterations N is increased. Further, in one or more examples, the depth d of the quantum circuit 400 is increased. In one or more examples, the depth d is increased after N has been increased to a predetermined maximum value, or if N has been increased a predetermined number of times.

The energy $\langle\Phi(\vec{\theta}_k)|H|\Phi(\vec{\theta}_k)\rangle \equiv \langle H\rangle_k$ for the k-th control is evaluated, as shown at block 685. For example, the computer 100 determines if the energy states are converging. If the energy converges, the energy is reported as a solution of the VQE. For example, the energy state estimate being within a predetermined threshold of a predetermined expected value is deemed as the energy estimates reaching convergence. For example, an energy error of approximately 0.0016 Hartree may be used to deem convergence when the best energy estimate is close to the exact solution up to chemical accuracy. If the convergence is detected, the execution of the method may be stopped with the trial state being used provided as the solution. For example, the trial state in the ongoing molecular structure example providing angles and/distances between the particles of the atom being analyzed. If the energy estimate, which is the optimization outcome for the feedback loop between the computer 100 and the quantum computer 300, has converged, in this case increasing, changing the parameters d, N, and/or S, will not improve the final answer for the energy estimate any further. Hence, the execution of the method is deemed completed.

If the energy estimate has not converged, the method continues to iterate until resource saturation of the quantum computer 300 is detected. Once the parameters have been increased, the method includes validating that the incremented values do not cause resource saturation at the quantum circuit 400, as shown at block 690. For example, predetermined decoherence limit, and/or a predetermined sampling time, may be used to limit how far the parameters are increased, because as the parameters are increased, the decoherence and the sampling time for generating the qubit states associated with measuring the energy states increase.

If the saturation limits are not met, the method iterates through the operations described herein until one or more of the stopping conditions are met. In one or more examples, a calibration time is monitored and the quantum computer 300 is recalibrated after every calibration time duration.

FIG. 8 depicts an example optimization of molecular structure application using the improved VQE according to one or more embodiments. Plot 805 in FIG. 8 depicts parity mapping of 8 spin orbitals onto 8 qubits, reduced to 6 qubits via qubit tapering of fermionic spin-parity symmetries according to one or more embodiments. The bars indicate the parity of the spin-orbitals encoded in each qubit 215. For example, the mapping may be used to map the 8 spin-orbital Hamiltonian of $BeH_2$ spin-orbital Hamiltonian using the parity mapping, and remove, as in the case of H2, two qubits associated to the spin-parity symmetries, reducing this to a 6 qubit problem that encodes 8 spin-orbitals. A similar approach may also be used to map LiH onto 4 qubits. The mapping is based on the mapping of the Hamiltonians for H2, LiH and BeH2 at their bond distance described earlier.

Further, the results from an optimization procedure are illustrated in the plot 810 of FIG. 8, using the BeH2 Hamiltonian for the interatomic distance of 1.7 Å. The results presented are for d=1, with a total of 30 Euler control angles (p=30) associated with 6 qubits. The inset of plot 810 shows the simultaneous perturbation of 30 Euler angles, as the energy estimates are updated. In this example scenario, to obtain the potential energy surfaces for H2, LiH, and BeH2, the ground state energy of their molecular Hamiltonians is searched using 2, 4, and 6 qubits respectively, for depth d=1, for a range of different interatomic distances. Here, for each iteration k, the gradient at each control $\vec{\theta}_k$ is approximated using $10^3$ samples (S=$10^3$) for energy estimations at $\vec{\theta}_k^+$ and $\vec{\theta}_k^-$. The inset shows the simultaneous optimization of 30 Euler angles that control the trial state preparation. The final energy estimate is obtained using the angles $\vec{\theta}_{final}$ averaged over the last predetermined number of angle updates, for example last 25. The last predetermined number of angle updates are used in one or more examples in order to mitigate the effect of stochastic fluctuations, with a higher number of $10^5$ samples, to get a more accurate energy estimation.

Figure 9:
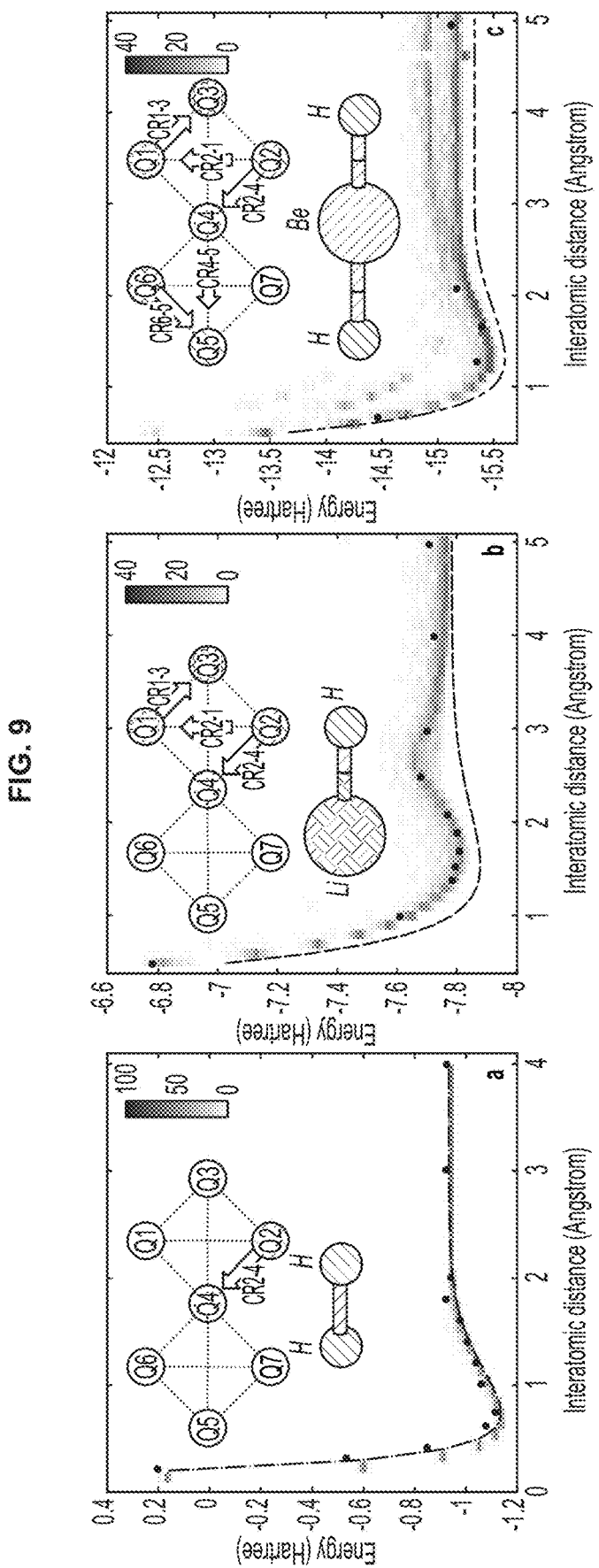
FIG. 9 depicts a comparison of results using the improved VQE using the trial states according to one or more embodiments with known values.

FIG. 9 depicts a comparison of results using the improved VQE using the trial states according to one or more embodiments with known values. The plots a, b, and c of FIG. 9 depict comparisons of the outcomes of molecular structure modeling for a number of interatomic distances for H2 (plot a) LiH (plot b), and BeH2 (plot c). The results from the quantum computer 300 are compared with outcomes from numerical simulations using depth d=1 circuits. Further, in FIG. 9, the top insets of each plot highlight the qubits used for each molecule modeling, and the cross-resonance gates that constitute $U_{ENT}$. For example, for H2 molecule, cross-resonance (CR) gates between qubits Q2 and Q4 constitute the entangler $U_{ENT}$, for LiH molecule, CR gates between qubit pairs Q2-Q4, Q2-Q1, and Q1-Q3 constitute the entangler $U_{ENT}$, and for the BeH2 molecule, CR gates between qubit pairs Q2-Q4, Q2-Q1, Q1-Q3, Q4-Q5, and Q6-Q5 constitute the entangler $U_{ENT}$. The bottom insets of each plot are representations of the molecular geometry, not drawn to scale. For all the three molecules, the deviation of the experimental results from the exact curves, is well explained by the stochastic simulations.

The technical solutions described herein thus facilitates use of a hardware-efficient trial state preparation that relies on gates that are accessible on quantum hardware. In one or more examples, the technical solutions described herein Use a fixed frequency superconducting qubit architecture. For example, the trial state preparation may use of fixed-frequency single-qubit and entangling quantum gates for trial state preparation, implemented using solely microwave pulses. The microwave pulses can be parameterized by variable amplitude and phase. Alternatively, the microwave pulses can be parameterized by constant amplitude with varying phase. The technical solutions described herein further facilitate use of parallelization of quantum gates for trial state preparation. For example, the technical solutions described herein describe the use of a unique set of single-qubit post-rotations at the different qubits in the quantum hardware, the rotations implemented using microwave pulses, for a measurement of multiple Hamiltonian terms that belong to the same tensor product basis set. The technical solutions described herein further facilitate use of a microwave-only qubit reset scheme.

Thus, the technical solutions described herein improve the use of VQE for quantum simulation, and thus provide an improvement to computing technology itself by generating and using hardware efficient trial states based on a superconducting quantum processor. The technical solutions described herein further improve the application of VQE for quantum simulation because the technical solutions described herein are implementable on near-term quantum hardware as opposed to typical solutions including full parameterization of unitaries in a UCC. Further, the technical solutions described herein facilitate mapping Fermions to qubits in an efficient manner for simulation of the Hamiltonians, (for example mapping 8 Hamiltonians to 6 qubits), thus improving efficiency of the quantum computer used. The efficiency is further improved by using a measurement scheme by binning Pauli operators diagonal in a Tensor Product Basis (TPB).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   a memory device including computer-executable instructions; and
   a processor coupled with the memory and configured to execute the computer-executable instructions to generate trial states for a variational quantum Eigenvalue solver (VQE) using a quantum computer that comprises a plurality of qubits, the generation comprising:
     selecting a number of iterations N for optimizing a particular trial state;
     selecting a number of samples S to capture from the qubits for the particular trial state, the samples comprising measurements of qubit states;
     mapping a Hamiltonian to the qubits of the quantum computer;
     setting up an entangler in the quantum computer, the entangler defining an entangling interaction between at least a subset of the qubits of the quantum computer, using an interleaved sequence of arbitrary single-qubit rotations and entangler operations;
     reading out, from the quantum computer, the qubit states after post-rotations associated with Pauli terms in the Hamiltonian, the qubit states representing expectation values of the Pauli terms, and the reading out being performed for the selected number of samples S;
     computing an estimated energy state using the measured expectation values of the Pauli terms in the Hamiltonian; and
     in response to the estimated energy state not converging with an expected energy state, optimizing the particular trial state for the VQE by updating angles according to which microwave pulses are sent to the qubits and iterating to compute the estimated energy using the updated angles, the iterations performed until the selected number of iterations for the particular trial state are reached.

2. The system of claim 1, wherein a new trial state is generated upon reaching the selected number of iterations, generation of trial states comprising:
  computing the new trial state for the VQE and iterating to compute the estimated energy using the new trial state for the selected N iterations; and
  in response to the estimated energy state not converging with the expected energy state after the selected N iterations, incrementing the selected number of samples S and the selected number of iterations N.

3. The system of claim 2, wherein the generation of the trial states further comprises:
  in response to the estimated energy state not converging with the expected energy state after the selected N iterations, incrementing a depth d associated with the quantum computer, the depth d indicating a number of entanglers used to setup the trial state.

4. The system of claim 1, wherein the entangler is a sequence of gates that entangle the qubits in the quantum computer.

5. The system of claim 4, wherein the gates in the entangler and in the single-qubit rotations operate using parallelization for trial state preparation.

6. The system of claim 1, wherein a unique set of single-qubit rotations, implemented using the microwave pulses, is used for measurement of multiple Hamiltonian terms that belong to the same tensor product basis set.

7. The system of claim 1, wherein the generation of the trial states further comprises:
  resetting the qubits of the quantum computer after each read out of the qubit states, the resetting comprising sending a reset pulse to the quantum computer.

8. The system of claim 1, the trial states being prepared using the microwave pulses that are parameterized by waveform, amplitude, and time.

9. A method for to generating trial states for a variational quantum Eigenvalue solver (VQE) using a quantum computer that comprises a plurality of qubits, the generation comprising:
  selecting a number of iterations N for optimizing a particular trial state;
  selecting a number of samples S to capture from the qubits for a particular trial state, the samples comprising measurements of qubit states;
  mapping a Hamiltonian to the qubits of the quantum computer;
  setting up an entangler in the quantum computer, the entangler defining an entangling interaction between at least a subset of the qubits of the quantum computer, the setting up using an interleaved sequence of arbitrary single qubit rotations and entangler operations;
  reading out, from the quantum computer, the measurements of qubit states after post-rotations associated with Pauli terms, the reading out being performed for the selected number of samples S;
  computing an estimated energy state using the measurements of the Pauli terms; and
  in response to the estimated energy state not converging with an expected energy state, optimizing the particular trial state for the VQE by updating angles according to which microwave pulses are sent to the qubits and iterating to compute the estimated energy using the updated angles, the iterations performed until the selected number of iterations for the particular trial state are reached.

10. The method of claim 9, wherein in response to the estimated energy state not converging with the expected energy state after the selected N iterations, incrementing the selected number of samples S and the selected number of iterations N.

11. The method of claim 10, further comprising, in response to the estimated energy state not converging with the expected energy state after the selected N iterations, incrementing a depth d associated with the quantum computer, the depth d indicating a number of entanglers in the trial state.

12. The method of claim 9, wherein the entangler is a sequence of gates that entangle the qubits in the quantum computer.

13. The method of claim 12, wherein the gates in the entangler operate using parallelization for trial state preparation.

14. The method of claim 9, wherein a unique set of single-qubit post-rotations, implemented using the microwave pulses, is used for measurement of multiple Hamiltonian terms that belong to the same tensor product basis set.

15. The method of claim 9, further comprising:
  resetting the qubits of the quantum computer after each read out of the qubit states, the resetting comprising sending a reset pulse to the quantum computer; and
  initializing the qubits to a ground state prior to each post-rotation.

16. A quantum computing device comprising:
  a plurality of qubits;
  a plurality of resonators corresponding to each of the qubits, each resonator configured to receive control signals for a corresponding qubit, and to send readout signal representing a qubit state of the corresponding qubit;
  wherein the quantum computing device generates trial states for a variational quantum Eigenvalue solver (VQE), the generation comprising:
    receiving, by the resonators, control pulses that prepare a trial state;
    setting up an entangler, the entangler defining an entangling interaction between at least a subset of the qubits, using an interleaved sequence of arbitrary single qubit rotations and entangler operations in order to prepare the trial state.
    reading out, by the resonators, qubit states after post-rotations associated with Pauli terms in a Hamiltonian, the reading out being performed for a selected number of samples S for computing an estimated energy state; and
    in response to the estimated energy state not converging with an expected energy state, receiving control signals to iterate by optimizing the trial state for the VQE by updating angles according to which the control pulses are sent to the qubits, the iterations performed until a selected number of iterations N for the particular trial state are reached.

17. The quantum computing device of claim 16, wherein in response to the estimated energy state not converging with the expected energy state after the selected number of N iterations, incrementing the selected number of samples S and the selected number of iterations N.

18. The quantum computing device of claim 16, wherein in response to the estimated energy state not converging with the expected energy state after the selected N iterations, incrementing a depth d associated with the quantum computer, the depth d indicating a number of entanglers in the trial state.

19. The quantum computing device of claim 16, wherein each of the resonators is configured to receive a reset pulse for resetting the corresponding qubit.

20. The quantum computing device of claim 16, wherein gates in the entangler operate using parallelization for trial state preparation.

* * * * *